No. 12,121. REISSUED JUNE 16, 1903.

Z. B. WEBB.

FOLDING BOX.

APPLICATION FILED FEB. 4, 1903.

Attest:
O. F. Kehr
W. H. Kennedy

Inventor:
Zaida B. Webb
by Philipp Vanya Rice & Kennedy
Attys

No. 12,121. Reissued June 16, 1903.

UNITED STATES PATENT OFFICE.

ZAIDA B. WEBB, OF FLORHAM PARK, NEW JERSEY, ASSIGNOR TO WEBB FOLDING BOX COMPANY, OF NEWARK, NEW JERSEY, A CORPORATION OF NEW JERSEY.

FOLDING BOX.

SPECIFICATION forming part of Reissued Letters Patent No. 12,121, dated June 16, 1903.

Original No. 692,561, dated February 4, 1902. Application for reissue filed February 4, 1903. Serial No. 141,933.

*To all whom it may concern:*

Be it known that I, ZAIDA B. WEBB, of Florham Park, Morris county, New Jersey, have invented certain new and useful Improvements in Folding Boxes, of which the following is a full, clear, and exact description.

My invention relates to improvements in folding boxes; and the object of my invention is to produce a simple folding box which can be easily manipulated, which cuts with very little waste of stock, and which when set up is held without glue and with the parts very firmly united.

To these ends my invention consists of a paper box, the construction and arrangement of which will be hereinafter described and claimed.

Reference is to be had to the accompanying drawings, forming part of this specification, in which similar figures of reference refer to similar parts throughout the several views.

Figure 1:
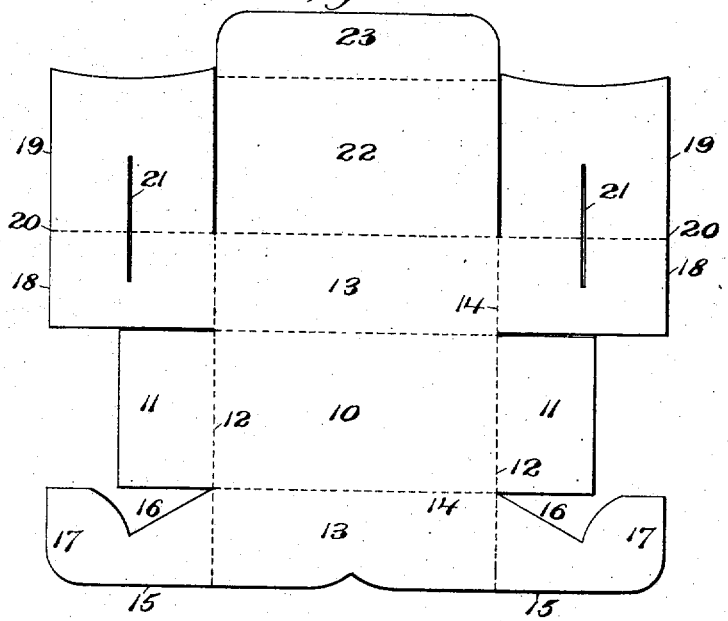
Figure 2:
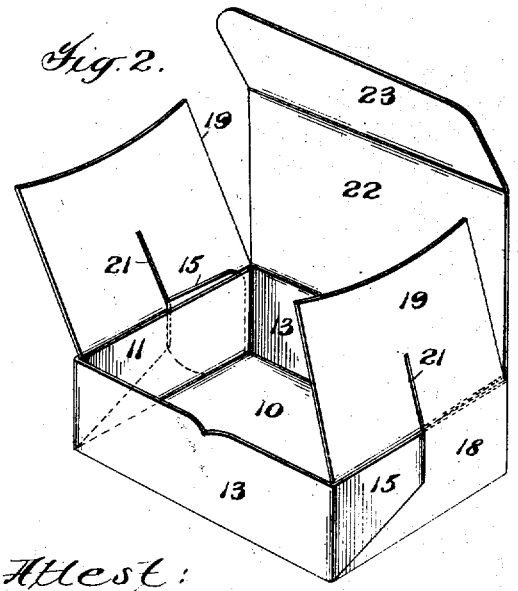

Figure 1 is a development of the blank of my improved box. Fig. 2 is a perspective view of the box when set up, and Fig. 3 is a broken perspective view of a slightly-modified form of the end fastenings of the box.

The box has a bottom portion 10 of rectangular shape, and projecting from two opposite edges of this are the end pieces 11, which are preferably separated from the bottom by score-lines 12, though it will be understood that score-lines may be used or not wherever they are mentioned, but they are always preferably employed where a bend is to be made. From the two remaining edges of the bottom 10 project the side pieces 13, which, like the end pieces, are of a width corresponding to the height of the box, and they are separated from the bottom by score-lines 14. The score-lines 12 are extended across the end portions of the side pieces 13, so as to separate from the side pieces the end flaps 15 and 18, the two former flaps projecting from one side piece 13 and having on the inner and under edge essentially triangular cuts 16, which produce the hook-like tongue 17, though the particular shape of these tongues may of course be departed from. The flaps 18, which are adapted to fold inward across the box ends and engage with the flaps 15, as will presently be described, have extensions 19, which are separated from the flaps by score-lines 20 and which are adapted to fold inward in the usual way to protect the contents of the box. In each flap 18 and its extension 19 is a slot 21, which extends across the score-line 20, so that part of the slot is in the flap 18 and part in the extension 19, and, as illustrated, this slot is at right angles to the score-line 20 and the length of the flap 18; but it is obvious that this angle may be changed and that the slot may be curved, if desired. It is important, however, that it extend across the score-line 20, because this enables the tongue 17 to be easily thrust through the slot when the extension-flap 19 is essentially vertical, and then the tongue 17 may be pressed downward and the flap 19 turned inward into the box, in this way making a perfect lock for the parts. From one of the side pieces 13 extends the top or cover 22, which has the usual terminal tuck 23; but the cover may be left off, if desired, although on this style of box it is better to use it.

When the box is set up, the end pieces 11 are turned up to a vertical position, the side pieces 13 are also turned up, the flaps 18 are turned inward against the end pieces 11, the flaps 15 are turned inward outside the flaps 18, and the tongues 17 inserted in the slots 21 and then pushed down, so that the cut-away part 16 of the flaps 15 registers with the lower edge of the slots 21, and the tongue 17 holds the ends together. The extension-flaps 19 are then turned inward, and in this way the tongues 17 are secured against accidental removal. It will be seen that this arrangement makes the box ends secure and that the end pieces 11 coming on the inside of the box present a perfectly-smooth inner surface.

Figure 3:
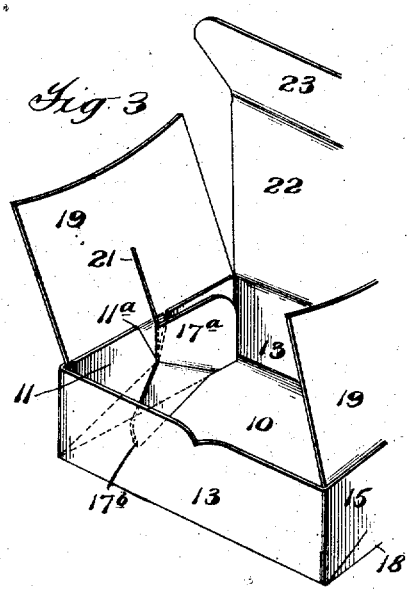

For some purposes the box ends may be made still firmer and the box more desirable by notching the upper edge of each end piece 11, as shown at $11^a$ in Fig. 3, and the tongue $17^a$ (see Fig. 3) may when thrust through the slot 21 also be pushed down through the notch $11^a$, thus binding the end piece 11 to the other parts, and as a still further protection the tongue $17^a$ may be provided with a wing $17^b$, which may be turned back against the tongue, so that both can be thrust through the slot 21 together, and then the wing $17^b$ may be opened out against the box end, as the drawings show. When this is done, the tongue 17[a] cannot be withdrawn without first folding back the wing.

Having thus described my invention, what I claim as new, and desire to secure by Letters Patent, is—

1. As an improved article of manufacture, a folding box comprising a bottom portion, side pieces on two edges thereof, one of said side pieces having end flaps with extensions on their upper edges and with slots transversely of the flaps partly in the flaps and partly in the extensions, and the second of said side pieces having end flaps with tongues on their inner edges which tongues are adapted to extend through the aforesaid slots and so hold the opposed end flaps together.

2. As an improved article of manufacture, a folding box comprising a bottom portion, end pieces projecting from two edges of the bottom portion, and side pieces projecting from the two remaining edges of the bottom, one side piece having end flaps with extensions on their upper and outer edges and with slots transversely of the flaps formed partly in the flaps and partly in the extensions thereof, and the second side piece having end flaps cut away on their inner edges to form hooks or tongues adapted to enter the slots of the first-mentioned flaps.

3. As an improved article of manufacture, a folding box comprising a bottom portion, end pieces projecting from two edges of the bottom portion, said end pieces having notches in their upper edges, and side pieces projecting from the two remaining edges of the bottom, one side piece having end flaps with extensions on their outer and upper edges and with slots transversely of the flaps formed partly in the flaps and partly in the aforesaid extensions, and the second side piece having end flaps cut away on their inner edges to form tongues adapted to extend through the aforesaid slots and engage with the notched end pieces.

4. As an improved article of manufacture, a folding box comprising a bottom portion, side pieces extending from two edges of the bottom portion having end flaps adapted to fold inward for forming the two remaining sides of the box, one of each pair of end flaps having an extension on its upper or outer edge adapted to fold inward and having a slot extending transversely of the flap and partly in the flap and partly in the extension, and the other of each pair of end flaps being cut away on its inner edge to form a tongue adapted to enter said slot.

5. A folding box having side pieces extending from opposite edges of the bottom piece, each having an end flap adapted to fold inward for forming a third side of the box, one of said end flaps having an extension on its upper or outer edge adapted to fold inward and having a slot extending transversely of the flap and partly in the flap and partly in the extension, and the other of said end flaps being cut away on its inner edge to form a tongue adapted to enter said slot.

In testimony whereof I have signed my name to this specification in the presence of two subscribing witnesses.

ZAIDA B. WEBB.

Witnesses:
W. H. KENNEDY,
A. L. KENT.